US012651858B2

(12) United States Patent
Peshkess

(10) Patent No.: US 12,651,858 B2
(45) Date of Patent: Jun. 9, 2026

(54) ELECTRICAL CONNECTOR THAT INCLUDES MULTIPLE TERMINALS

(71) Applicant: Lear Corporation, Southfield, MI (US)

(72) Inventor: Adi Peshkess, Canton, MI (US)

(73) Assignee: Lear Corporation, Southfield, MI (US)

( * ) Notice: Subject to any disclaimer, the term of this patent is extended or adjusted under 35 U.S.C. 154(b) by 274 days.

(21) Appl. No.: 18/377,048

(22) Filed: Oct. 5, 2023

(65) Prior Publication Data

US 2025/0118917 A1 Apr. 10, 2025

(51) Int. Cl.
*H01R 13/10* (2006.01)
*H01R 13/502* (2006.01)

(52) U.S. Cl.
CPC ........... *H01R 13/10* (2013.01); *H01R 13/502* (2013.01)

(58) Field of Classification Search
CPC .... H01R 13/10; H01R 13/502; H01R 13/506; H01R 13/514
USPC ......................................... 439/775, 696, 695
See application file for complete search history.

(56) References Cited

U.S. PATENT DOCUMENTS 2,585,770 A 2/1952 Hammerly
3,126,240 A 3/1964 Christensen et al.
3,219,887 A 11/1965 Gerg et al.
3,345,455 A 10/1967 Goody
3,391,378 A 7/1968 Fisher
3,513,425 A 5/1970 Arndt
3,519,730 A 7/1970 Fouse et al.
3,683,313 A 8/1972 Weimer et al.
3,818,119 A 6/1974 Sutherland et al.
3,893,233 A 7/1975 Glover
4,094,564 A 6/1978 Cacolici
4,194,805 A * 3/1980 Ayer .................... H01R 13/504 439/480
4,758,172 A 7/1988 Richards et al.
4,781,614 A * 11/1988 Ahroni ................. H01R 13/506 439/696
4,842,534 A 6/1989 Mobley et al.
4,886,468 A 12/1989 Harton et al.
5,196,987 A 3/1993 Webber et al.
5,447,452 A * 9/1995 Takano ................ H01R 13/506 439/695
5,474,475 A 12/1995 Yamaguchi
5,551,894 A 9/1996 Lin et al.

(Continued)

FOREIGN PATENT DOCUMENTS

WO 2010142514 A1 12/2010

*Primary Examiner* — Gary F Paumen
(74) *Attorney, Agent, or Firm* — MacMillan, Sobanski & Todd, LLC

(57) ABSTRACT

Electrical connectors are described. An example electrical connector has a housing, a cover releasably attached to the housing, a first blade, and a second blade. The housing has housing first end, a housing second end, a connector portion, and defines a shoulder, a first passageway, a second passageway, and a projection. The first passageway and the second passageway are defined on the connector portion. The first blade is partially disposed within the first passageway and is attached to the housing. The first blade has a first blade second end disposed a first distance from the projection. The second blade is partially disposed within the second passageway and is attached to the housing. The second blade has a second blade second end disposed a second distance from the projection that is different than the first distance.

20 Claims, 11 Drawing Sheets

(56) References Cited

U.S. PATENT DOCUMENTS

| | | | |
|---|---|---|---|
| 5,554,040 A | 9/1996 | Sugiura et al. | |
| 5,601,447 A * | 2/1997 | Reed | H01R 13/6463 439/465 |
| 5,619,014 A | 4/1997 | Faulkner | |
| 5,816,858 A | 10/1998 | Kazarian et al. | |
| 5,971,796 A | 10/1999 | Duhr | |
| 6,045,412 A | 4/2000 | Guanco et al. | |
| 6,142,807 A | 11/2000 | Faulkner | |
| 6,183,304 B1 * | 2/2001 | Hollander | G01K 7/023 439/620.05 |
| 6,514,091 B2 | 2/2003 | Saito et al. | |
| 6,634,892 B2 | 10/2003 | Nakamura | |
| 6,773,314 B2 | 8/2004 | Mills et al. | |
| 6,830,481 B1 | 12/2004 | Umeshita et al. | |
| 6,916,990 B2 | 7/2005 | Behziz et al. | |
| 6,935,884 B1 * | 8/2005 | Perkin | H01R 4/2466 439/409 |
| 6,955,570 B2 | 10/2005 | Mills et al. | |
| 7,077,708 B1 * | 7/2006 | Johnson | H01R 13/506 439/906 |
| 7,268,300 B2 | 9/2007 | Miyazaki | |
| 7,568,921 B2 | 8/2009 | Pavlovic et al. | |
| 7,652,552 B2 | 1/2010 | Fussl et al. | |
| 7,876,193 B2 | 1/2011 | Pavlovic et al. | |
| 7,893,364 B2 | 2/2011 | Oda | |
| 7,967,622 B2 | 6/2011 | Bruetsch et al. | |
| 8,163,994 B2 | 4/2012 | Taniguchi et al. | |
| 8,167,632 B2 | 5/2012 | Bruetsch et al. | |
| 8,382,525 B2 | 2/2013 | Shiraki | |
| 9,083,127 B2 | 7/2015 | Maloney et al. | |
| 9,252,582 B2 | 2/2016 | Li et al. | |
| 9,627,785 B1 | 4/2017 | Melchor Saucedo et al. | |
| 9,722,328 B2 | 8/2017 | Wimmer | |
| 10,177,513 B1 | 1/2019 | Glick et al. | |
| 10,218,130 B1 | 2/2019 | Jung | |
| 10,349,539 B2 | 7/2019 | Reynoso Galvan et al. | |
| 10,468,841 B2 | 11/2019 | Rangi et al. | |
| 10,622,768 B1 | 4/2020 | Cowham et al. | |
| 10,629,401 B2 | 4/2020 | Rangi et al. | |
| 10,763,629 B1 | 9/2020 | Rangi et al. | |
| 10,964,929 B2 | 3/2021 | Ichikawa et al. | |
| 11,532,930 B2 | 12/2022 | Roger et al. | |
| 11,575,225 B2 | 2/2023 | Liu et al. | |
| 2004/0109296 A1 | 6/2004 | Nakayama et al. | |
| 2004/0219806 A1 | 11/2004 | Kobayashi | |
| 2005/0227542 A1 | 10/2005 | Fukushima et al. | |
| 2008/0242119 A1 | 10/2008 | Rosch et al. | |
| 2008/0242150 A1 | 10/2008 | Chikamatsu et al. | |
| 2009/0001812 A1 | 1/2009 | Brooks | |
| 2009/0309689 A1 | 12/2009 | Pavlovic et al. | |
| 2010/0041510 A1 | 2/2010 | Gladd et al. | |
| 2010/0102920 A1 | 4/2010 | Stanek et al. | |
| 2010/0124834 A1 | 5/2010 | De Chazal et al. | |
| 2010/0167596 A1 * | 7/2010 | Yang | H01R 13/7137 439/692 |
| 2010/0203746 A1 | 8/2010 | Kita | |
| 2010/0259355 A1 | 10/2010 | Buettner et al. | |
| 2010/0317241 A1 | 12/2010 | Sugiura et al. | |
| 2010/0328018 A1 | 12/2010 | Matsumoto | |
| 2011/0306243 A1 | 12/2011 | Shiraki | |
| 2012/0329296 A1 | 12/2012 | Hara et al. | |
| 2016/0073520 A1 | 3/2016 | Darr et al. | |
| 2017/0311457 A1 | 10/2017 | Kubota et al. | |
| 2018/0076586 A1 | 3/2018 | Rangi | |
| 2019/0104622 A1 | 4/2019 | Reynoso Galvan et al. | |

* cited by examiner

ELECTRICAL CONNECTOR THAT INCLUDES MULTIPLE TERMINALS

SUMMARY

Various examples of electrical connectors are described. An example electrical connector has a housing, a cover, a first blade, and a second blade. The housing has housing first end, a housing second end, a connector portion, and defines a shoulder, a first passageway, a second passageway, and a projection. The connector portion extends from the housing first end to the shoulder. The projection extends from the shoulder to the housing second end. The first passageway and the second passageway are defined on the connector portion. The cover is releasably attached to the housing. The first blade is partially disposed within the first passageway and is attached to the housing. The first blade has a first blade first end and a first blade second end. The first blade second end is disposed a first distance from the projection. The second blade is partially disposed within the second passageway and is attached to the housing. The second blade has a second blade first end and a second blade second end. The second blade second end is disposed a second distance from the projection that is different than the first distance.

Additional understanding of these examples can be obtained by review of the detailed description, below, and the appended drawings.

DETAILED DESCRIPTION

Figure 1:
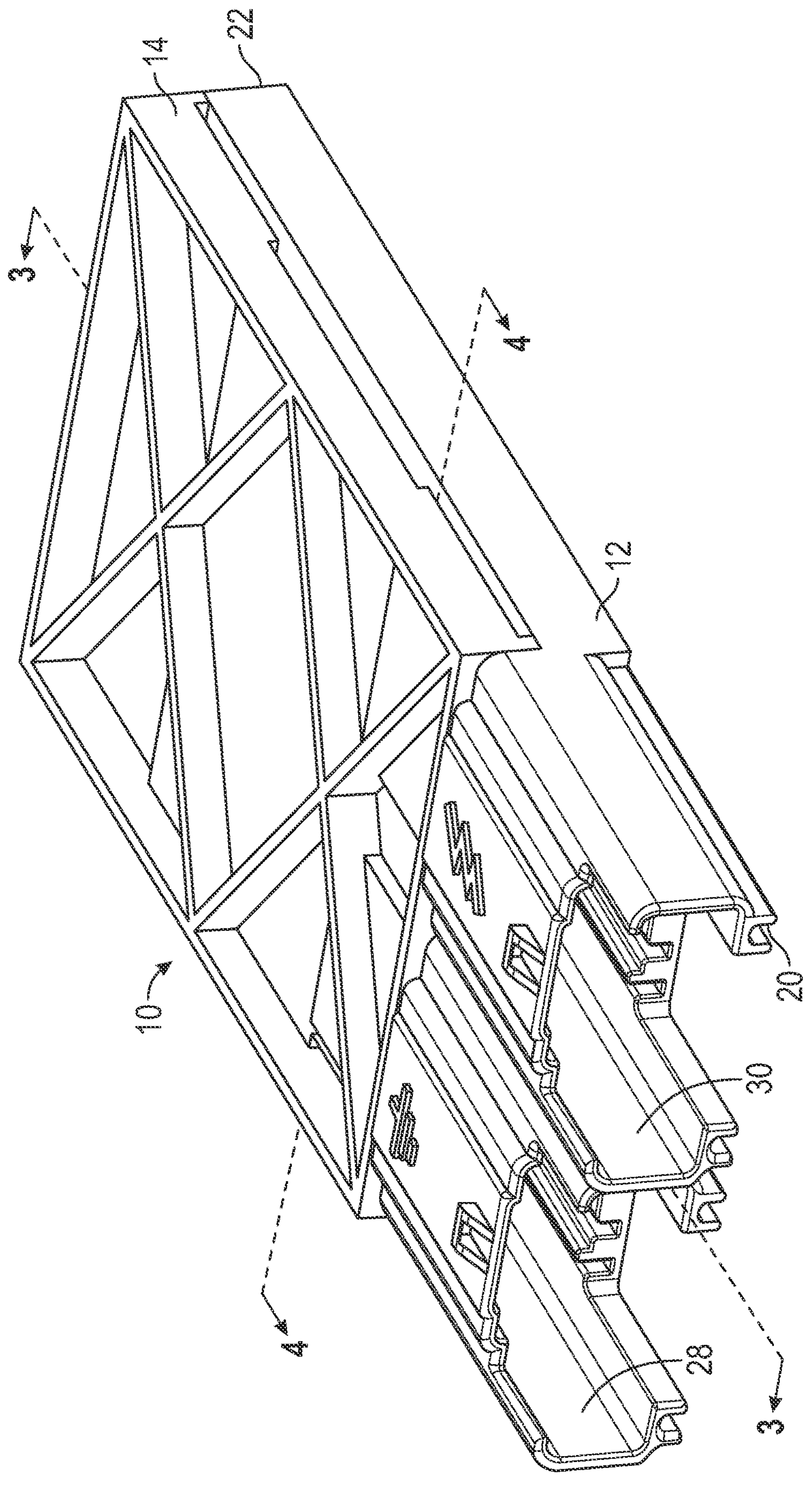
FIG. 1 is a perspective view of a first embodiment of an electrical connector.

The following detailed description and the appended drawings describe and illustrate various example embodiments of an electrical connector that includes multiple terminals. The description and illustration of these examples are provided to enable one skilled in the art to make and use an electrical connector that includes multiple terminals according to this invention. They are not intended to limit the scope of the claims in any manner.

FIGS. 1 through 11 illustrate a first example electrical connector 10 that includes a housing 12, a cover 14, a first blade 16, and a second blade 18.

The housing 12 has a housing lengthwise axis 13, a housing first end 20, a housing second end 22, a connector portion 24, and defines a shoulder 26, a first passageway 28, a second passageway 30, a projection 32, a first recess 34, a second recess 36, a third passageway 38, a first protrusion 40, a second protrusion 42, and a third protrusion 44. The housing lengthwise axis 13 extends from the housing first end 20 to the housing second end 22.

The connector portion 24 extends from the housing first end 20 toward the housing second end 22. In the illustrated embodiment, the connector portion 24 extends from the housing first end 20 to the shoulder 26. Each of the first passageway 28 and the second passageway 30 is defined on the connector portion 24. The shoulder 26 is disposed between the housing first end 20 and the housing second end 22 and provides a mechanical stop to advancement of the cover 14.

The first passageway 28 extends from the housing first end 20 to the shoulder 26, has a first passageway central axis 29 disposed parallel to the housing lengthwise axis 13, a first passageway length 31, and is sized and configured to receive a portion of the first blade 16. The first passageway 28 has a first inside width 21 and a second inside width 23 that is less than the first inside width 21. The first inside width 21 is disposed between the housing first end 20 and the shoulder 26 and the second inside width 23 is disposed along the shoulder 26. The second passageway 30 extends from the housing first end 20 to the shoulder 26, has a second passageway central axis 33 disposed parallel to the housing lengthwise axis 13 and the first passageway central axis 29, a second passageway length 35, and is sized and configured to receive a portion of the second blade 18. The second passageway 30 has a first inside width 25 and a second inside width 27 that is less than the first inside width 25. The first inside width 25 is disposed between the housing first end 20 and the shoulder 26 and the second inside width 27 is disposed along the shoulder 26.

Figure 8:
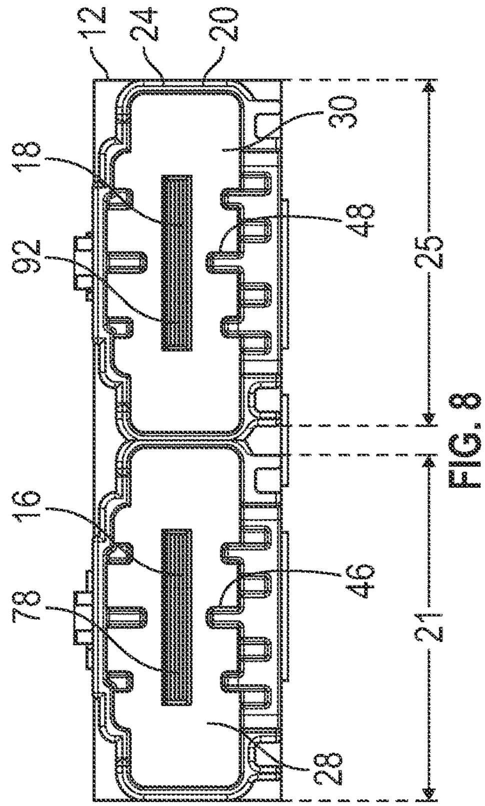
FIG. 8 is a rear view of the housing, the first blade, and the second blade of the electrical connector shown in FIG. 1.
Figure 9:
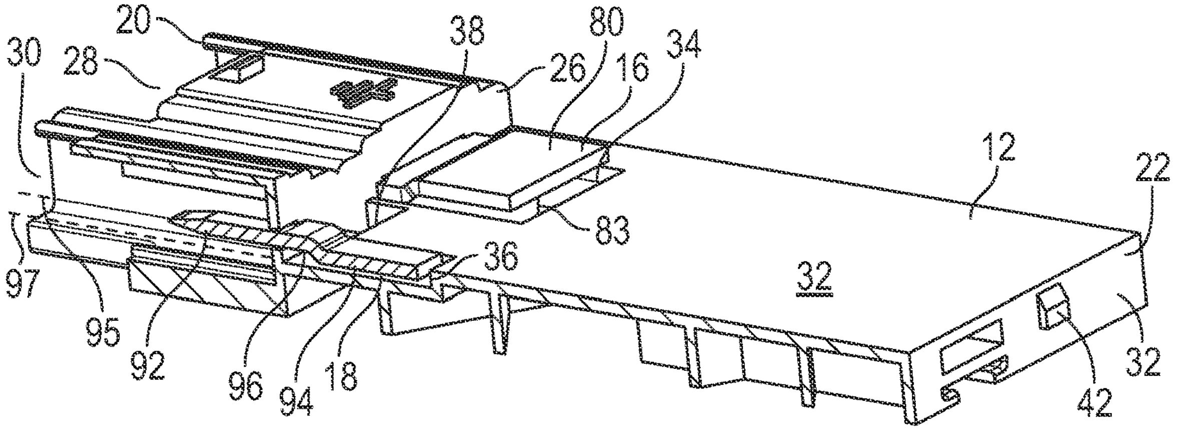
FIG. 9 is a sectional view of the housing, the first blade, and the second blade shown in FIG. 5 taken along line 9-9.
Figure 10:
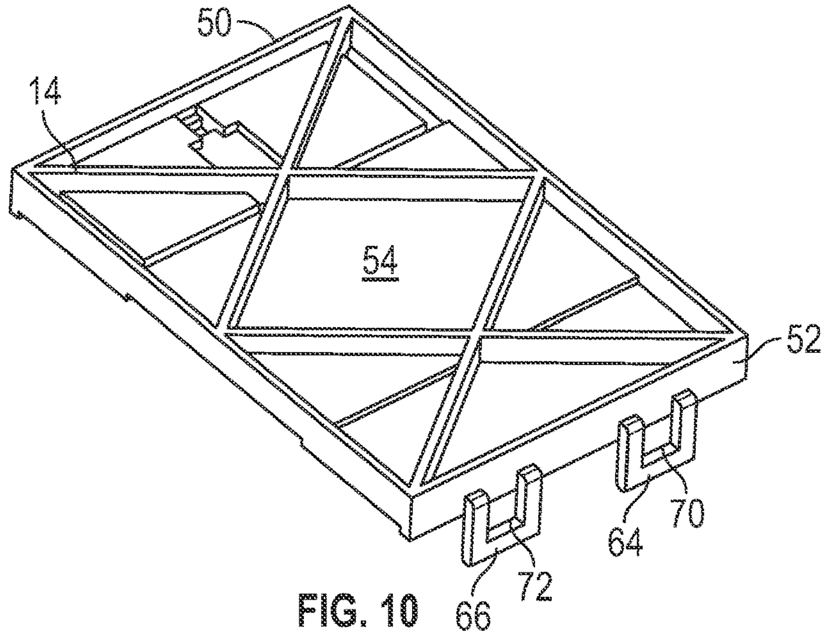
FIG. 10 is a perspective view of the cover of the electrical connector shown in FIG. 1.
Figure 11:
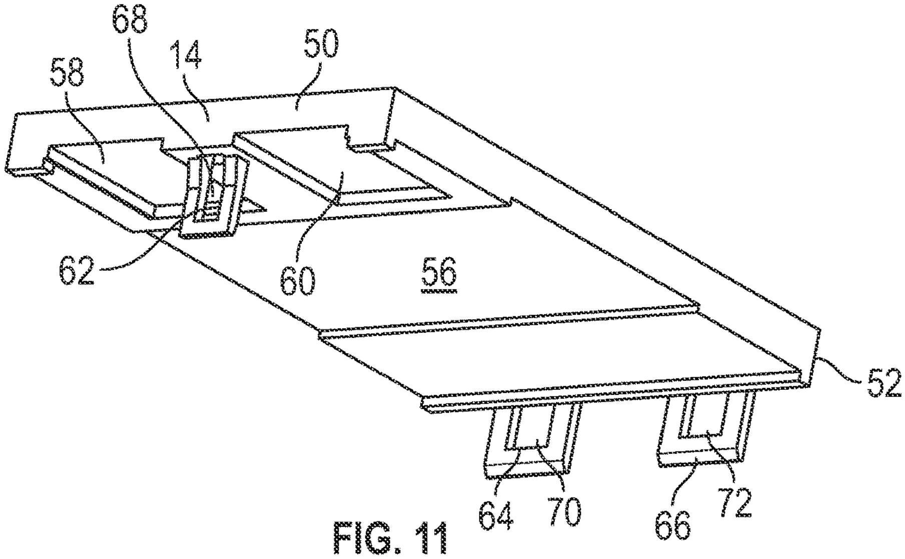
FIG. 11 is another perspective view of the cover of the electrical connector shown in FIG. 1.

While the first passageway central axis 29 and the second passageway central axis 33 have been illustrated as being parallel to the housing lengthwise axis 13, alternative embodiments can include a passageway that has a central axis that is not disposed parallel to a housing lengthwise axis or a passageway central axis. Each of the first passageway 28 and the second passageway 30 facilitates the insertion and securing of other electrical connectors to the electrical connector 10. As shown in FIG. 8, the housing 12 defines a first keyed track 46 within the first passageway 28 and a second keyed track 48 in the second passageway 30. The first keyed track 46 and the second keyed track 48 allow an electrical connector having a mating structural arrangement to be inserted into the first passageway 28 or the second passageway 30, which prevents use of connectors that do not have a mating configuration. In the illustrated embodiment, the first and second keyed tracks 46, 48 have the same structural arrangement. However, in alternative embodiments, a first keyed track and a second keyed track can have different structural arrangements. For example, in embodiments in which a first electrical connector is being used as a ground, a first passageway can include a first keyed track that mates with the first electrical connector allowing a user to confirm the first electrical connector is being used in the correct passageway and, as described herein, connects to the appropriate flat flexible cable.

The projection 32 extends from the housing second end 22 toward the housing first end 20. In the illustrated embodiment, the projection 32 extends from the shoulder 26 to the housing second end 22. The projection 32 provides structure on which one or more flat flexible cables can be disposed. Each of the first recess 34 and the second recess 36 is defined on the projection 32. The first recess 34 extends from the shoulder 26 toward the housing second end 22 and into the projection 32. The second recess 36 extends from the shoulder 26 toward the housing second end 22 and into the projection 32. The first recess 34 is sized and configured to house a portion of the first blade 16. The second recess 36 is sized and configured to house a portion of the second blade 18. While first and second recesses 34, 36 have been illustrated, alternative embodiments can omit the inclusion of a first recess, a second recess, or both recesses.

The third passageway 38 is disposed between the first recess 34 and the second recess 36 and extends through the projection 32. The third passageway 38 is sized and configured to receive the first projection 62 of the cover 14, as described in more detail herein. The first protrusion 40 extends from the projection 32 and into the third passageway 38. The second protrusion 42 is disposed on the housing second end 22 and extends from the projection 32 away from the housing first end 20. The third protrusion 44 is disposed on the housing second end 22 and extends from the projection 32 away from the housing first end 20.

While the housing 12 has been illustrated as having a particular structural arrangement, a housing included in an electrical connector can have any suitable structural arrangement. Selection of a suitable structural arrangement for a housing included in an electrical connector can be based on various considerations, such as the type of component to which the electrical connector is being attached. A housing can be formed of any suitable material and selection of a suitable material can be based on various considerations, such as the intended use of an electrical connector of which a housing is a component. Examples of materials considered suitable to form a housing include electrically nonconductive materials, plastics, and any other material considered suitable for a particular embodiment.

Figure 2:
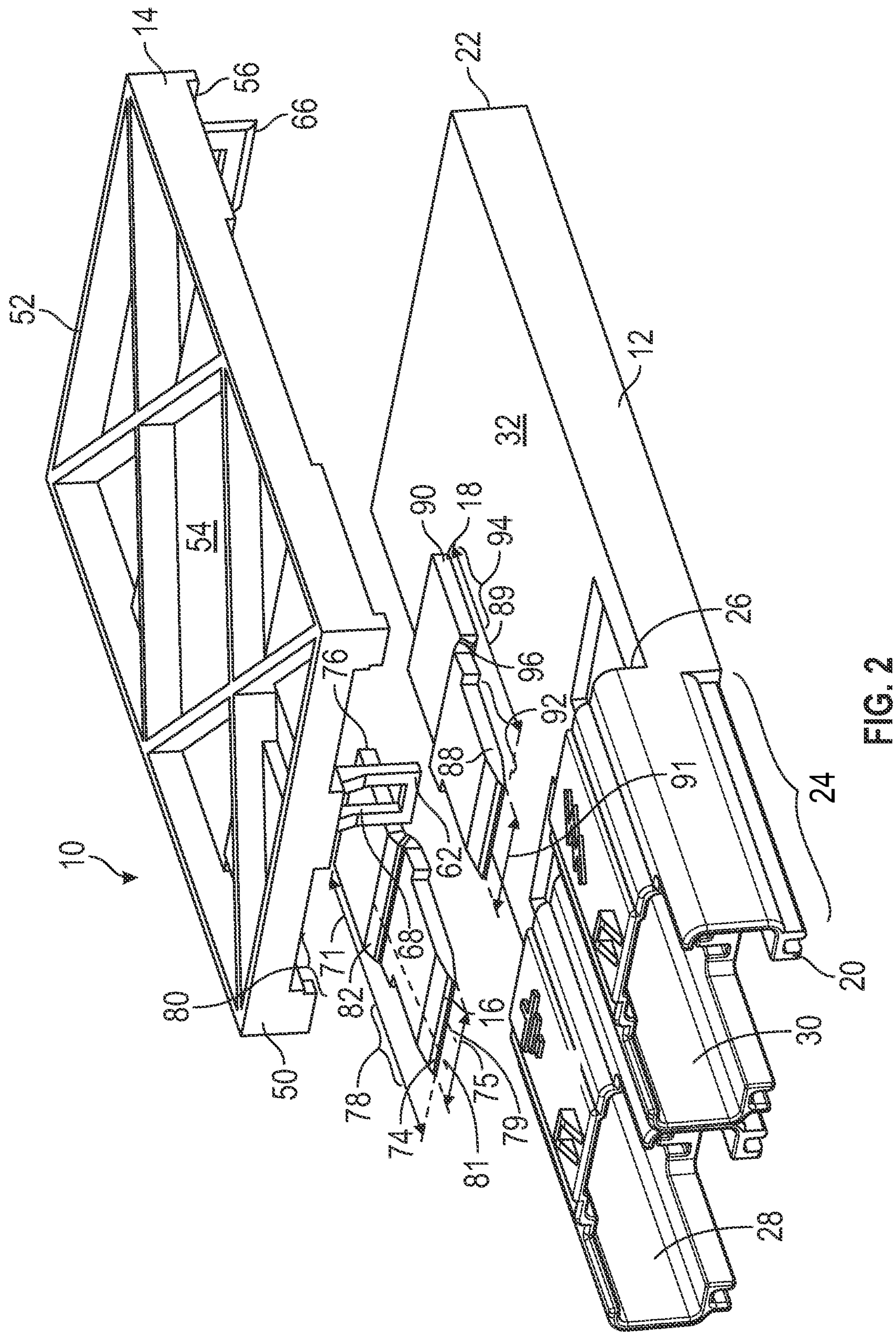
FIG. 2 is an exploded view of the electrical connector shown in FIG. 1.
Figure 3:
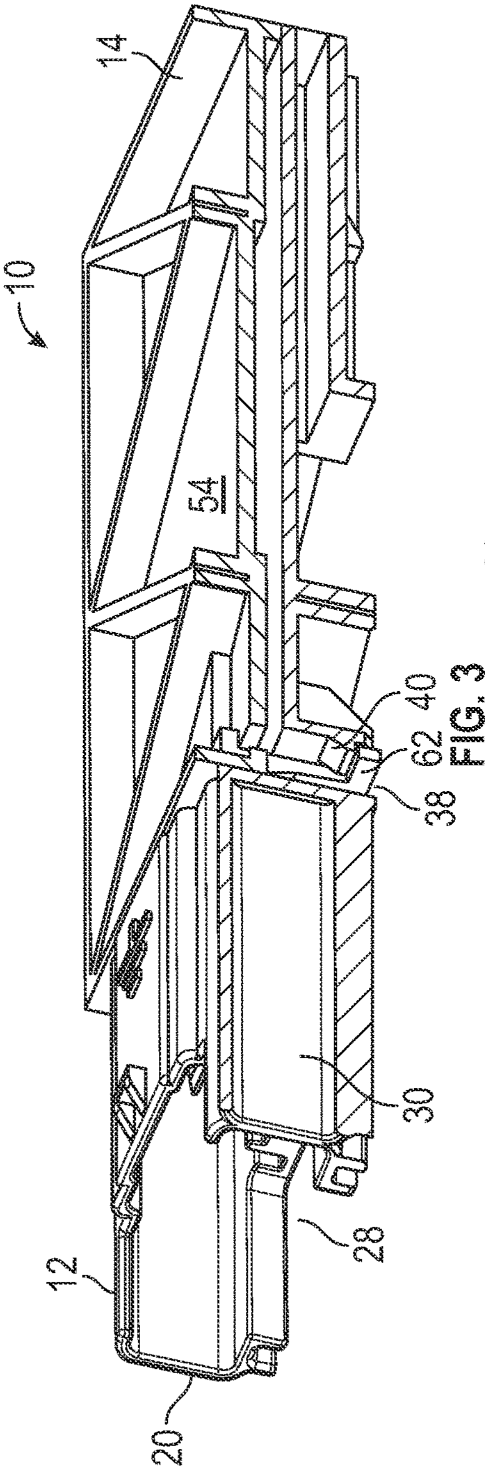
FIG. 3 is a sectional view of the electrical connector shown in FIG. 1 taken along line 3-3.

The cover 14 is attachable to the housing 12 when disassembled, as shown in FIG. 2. When assembled, as shown in FIG. 1, the cover 14 is releasably attached to the housing 12, is disposed on the projection 32, and disposed adjacent to the shoulder 26. The cover 14 has a cover first end 50, a cover second end 52, a top 54, and a bottom 56, and defines a first recess 58, a second recess 60, a first projection 62, a second projection 64, and a third projection 66.

Each of the first recess 58 and the second recess 60 extends from the cover first end 50 toward the cover second end 52 and from the bottom 56 toward the top 54. The first recess 58 is sized and configured to house a portion of the first blade 16. The second recess 60 is sized and configured to house a portion of the second blade 18. While first and second recesses 58, 60 have been illustrated, alternative embodiments can omit the inclusion of a first recess, a second recess, or both recesses. The first projection 62 is disposed between the first recess 58 and the second recess 60 and extends from the bottom 56 and away from the top 54. When assembled, the first projection 62 is disposed within the third passageway 38. The second projection 64 extends from the cover second end 52 and away from the top 54. The third projection 66 extends from the cover second end 52 and away from the top 54. The first projection 62 has an opening 68 that is sized and configured to receive the first protrusion 40 defined by the housing 12 to accomplish releasable attachment of the cover 14 to the housing 12. The second projection 64 has an opening 70 that is sized and configured to receive the second protrusion 42 defined by the housing 12 to accomplish releasable attachment of the cover 14 to the housing 12. The third projection 66 has an opening 72 that is sized and configured to receive the third protrusion 44 defined by the housing 12 to accomplish releasable attachment of the cover 14 to the housing 12.

While the cover 14 has been illustrated as having a particular structural arrangement, a cover included in an electrical connector can have any suitable structural arrangement. Selection of a suitable structural arrangement for a cover included in an electrical connector can be based on various considerations, such as the type of component to which the electrical connector is being attached. A cover can be formed of any suitable material and selection of a suitable material can be based on various considerations, such as the intended use of an electrical connector of which a cover is a component. Examples of materials considered suitable to form a cover include electrically nonconductive materials, plastics, and any other material considered suitable for a particular embodiment.

The first blade 16 is partially disposed within the first passageway 28 and is attached to the housing 12. The first blade 16 has a first blade first end 74, a first blade second end 76, a first blade length 71, a first blade first portion 78, a first blade second portion 80, and a first blade bend 82. When the cover 14 is releasably attached to the housing 12, the first blade 16 is partially disposed between the cover 14 and the housing 12 (e.g., projection 32). The first blade length 71 extends from the first blade first end 74 to the first blade second end 76 and is less than the first passageway length 31. The first blade first portion 78 extends from the first blade first end 74 to the first blade bend 82 and has a first width 75. The first blade second portion 80 extends from the first blade second end 76 to the first blade bend 82 and has a second width 77 that is greater than the first width 75. The first blade bend 82 is disposed between the first blade first portion 78 and the first blade second portion 80. The first blade first portion 78 has a first lengthwise axis 79 and the first blade second portion 80 has a second lengthwise axis 81. The first lengthwise axis 79 is parallel to the second lengthwise axis 81 and is noncoaxial with the second lengthwise axis 81. In the illustrated embodiment, the first blade second end 76 disposed a first distance 83 from the projection 32 and the first blade bend 82 is disposed between the shoulder 26 and the cover 14.

The second blade 18 is partially disposed within the second passageway 30 and is attached to the housing 12. The second blade 18 has a second blade first end 88, a second blade second end 90, a second blade length 89, a second blade first portion 92, a second blade second portion 94, and a second blade bend 96. When the cover 14 is releasably attached to the housing 12, the second blade 18 is partially disposed between the cover 14 and the housing 12 (e.g., projection 32). The second blade length 89 extends from the second blade first end 88 to the second blade second end 90 and is less than the second passageway length 35. The second blade first portion 92 extends from the second blade first end 88 to the second blade bend 96 and has a first width 91. The second blade second portion 94 extends from the second blade second end 90 to the second blade bend 96 and has a second width 93 that is greater than the first width 91. The second blade bend 96 is disposed between the second blade first portion 92 and the second blade second portion 94. The second blade first portion 92 has a first lengthwise axis 95 and the second blade second portion 94 has a second lengthwise axis 97. The first lengthwise axis 95 is parallel to the second lengthwise axis 97 and is noncoaxial with the second lengthwise axis 97. In the illustrated embodiment, the second blade second end 90 disposed a second distance 99 from the projection 32 and the second blade bend 96 is disposed between the shoulder 26 and the cover 14. The second distance 99 is different than the first distance 83. In the illustrated embodiment, the second distance 99 is less than the first distance 83.

Each of the first blade 16 and the second blade 18 can be any suitable electrical component having the features described herein, such as an electrical blade or electrical terminal. While each of the first blade 16 and the second blade 18 has been illustrated as having a particular structural arrangement, a blade included in an electrical connector can have any suitable structural arrangement. Selection of a suitable structural arrangement for a blade included in an electrical connector can be based on various considerations, such as the type of component to which the electrical connector is being attached. A blade can be formed of any suitable material and selection of a suitable material can be based on various considerations, such as the intended use of an electrical connector of which a blade is a component. Examples of materials considered suitable to form a blade include electrically conductive materials, and any other material considered suitable for a particular embodiment.

Figure 4:
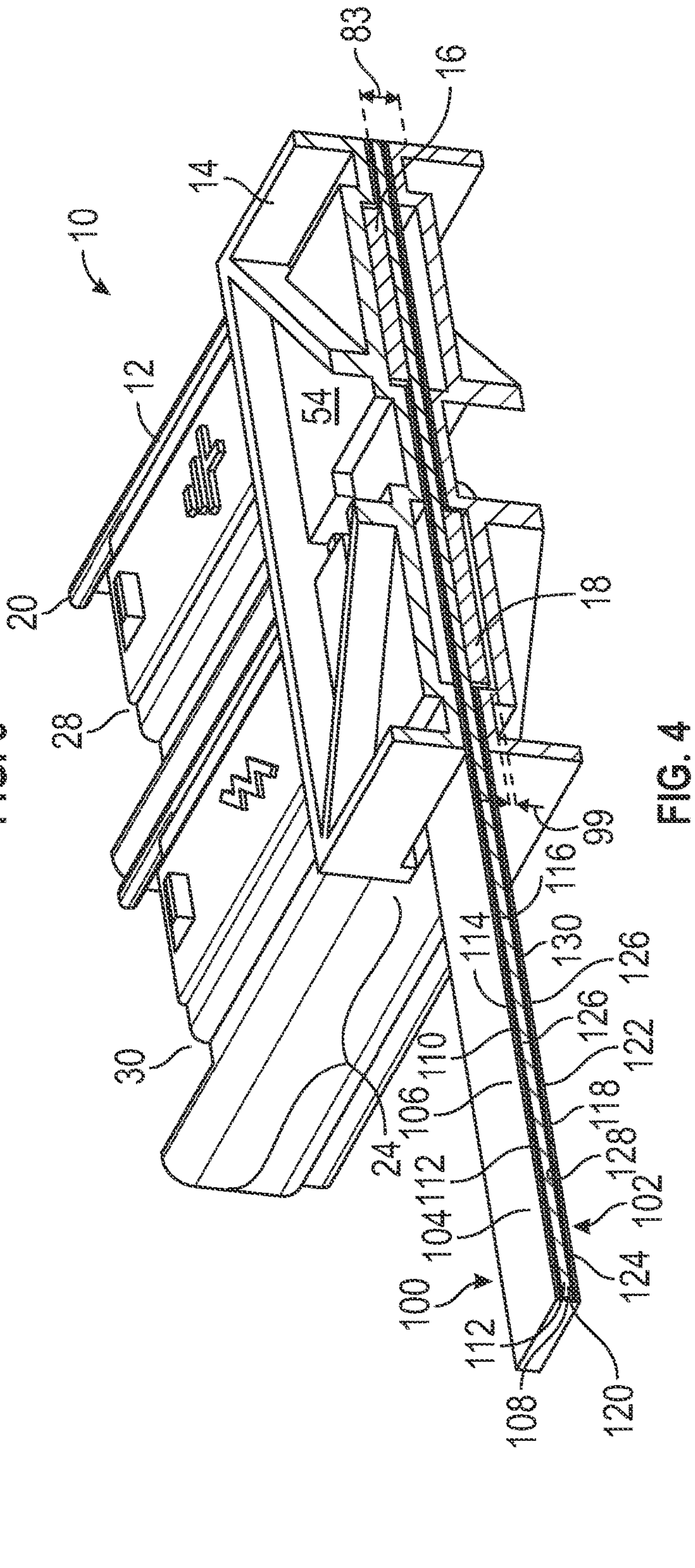
FIG. 4 is a sectional view of the electrical connector shown in FIG. 1 taken along line 4-4. A first conductive structure and a second conductive structure are shown disposed between the housing and the cover.
Figure 5:
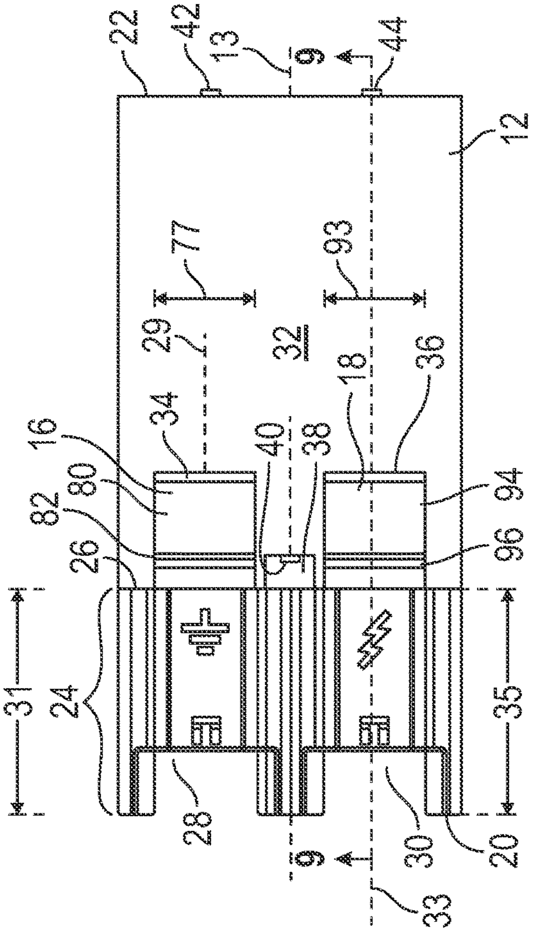
FIG. 5 is a top view of the housing, the first blade, and the second blade of the electrical connector shown in FIG. 1.
Figure 6:
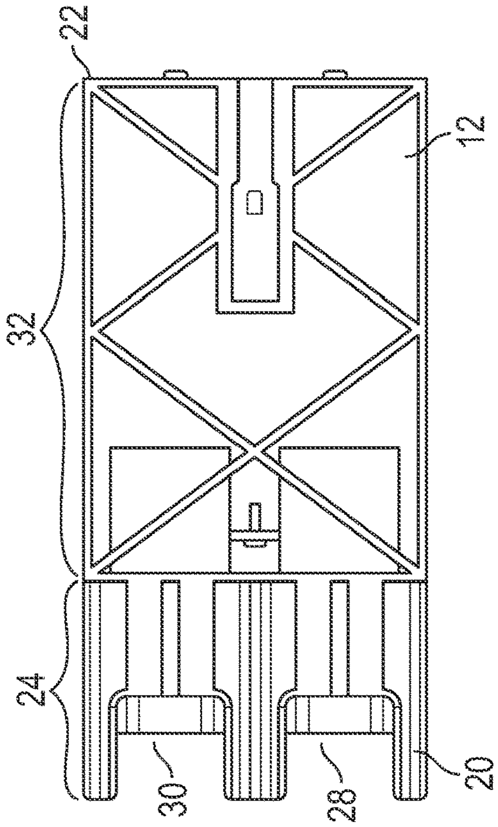
FIG. 6 is a bottom view of the housing of the electrical connector shown in FIG. 1.
Figure 7:
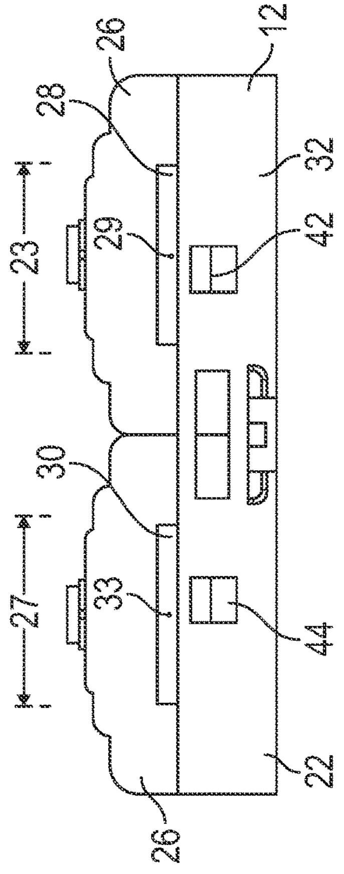
FIG. 7 is a front view of the housing of the electrical connector shown in FIG. 1.

As shown in FIG. 4, during use, a first conductive structure 100 and a second conductive structure 102 can be positioned between the housing 12 and the cover 14 and attached (e.g., releasably) to the electrical connector 10. In the illustrated embodiment, the first conductive structure 100 is a flat flexible cable 104 that has a first side 106, a second side 108, an electrically conductive trace 110, and an outer electrically non-conductive insulator 112 surrounding the electrically conductive trace 110. The electrically conductive trace 110 has a top 114 and a bottom 116. A portion of the electrically non-conductive insulator 112 is removed along the first side 106 and adjacent to, or near, the first blade 16 such that an electrical connection between the first blade 16 and the electrically conductive trace 110 is achieved. As shown in FIG. 4, the first blade 16 contacts the top 114 of the electrically conductive trace 110 to accomplish the electrical connection.

In the illustrated embodiment, the second conductive structure 102 is a flat flexible cable 118 that has a first side 120, a second side 122, an electrically conductive trace 124, and an outer electrically non-conductive insulator 126 surrounding the electrically conductive trace 124. The electrically conductive trace 124 has a top 128 and a bottom 130. A portion of the electrically non-conductive insulator 126 is removed along the second side 122 and adjacent to, or near, the second blade 18 such that an electrical connection between the second blade 18 and the electrically conductive trace 124 is achieved. As shown in FIG. 4, the second blade 18 contacts the bottom 130 of the electrically conductive trace 124 to accomplish the electrical connection.

The first blade 16 is attached to the electrically conductive trace 110 and the second blade 18 is attached to the electrically conductive trace 124. Attachment between a blade and an electrically conductive trace can be accomplished using any suitable technique or method of attachment and selection of a suitable type of attachment can be based on various considerations, such as the material(s) forming a blade and/or an electrically conductive trace. Examples of techniques and methods of attachment considered suitable between a blade and an electrically conductive trace include using adhesives, ultrasonic welding, and any other technique or method considered suitable for a particular embodiment.

In use, and while the cover 14 is free of the housing 12, the first and second conductive structures 100, 102 are positioned on the projection 32 of the housing 12 such that the first conductive structure 100 is electrically connected to the first blade 16 and the second conductive structure 102 is electrically connected to the second blade 18. Subsequently, the cover 14 is releasably attached to the housing 12 to attach the first and second electrically conductive structures 100, 102 to the electrical connector 10.

FIGS. 12 through 23 illustrate a second example electrical connector 210 that includes a housing 212, a cover 214, a first blade 216, a second blade 218, and a fuse 350.

The housing 212 has a housing lengthwise axis 213, a housing first end 220, a housing second end 222, a connector portion 224, and defines a shoulder 226, a first passageway 228, a second passageway 230, a projection 232, a first recess 234, a third passageway 238, a first protrusion 240, a second protrusion 242, a third protrusion 244, a fourth passageway 352, and a fifth passageway 354. The housing lengthwise axis 213 extends from the housing first end 220 to the housing second end 222.

The connector portion 224 extends from the housing first end 220 toward the housing second end 222. In the illustrated embodiment, the connector portion 224 extends from the housing first end 220 to the shoulder 226. Each of the first passageway 228, the second passageway 230, the fourth passageway 352, and the fifth passageway 354 is defined on the connector portion 224. The shoulder 226 is disposed between the housing first end 220 and the housing second end 222 and provides a mechanical stop to advancement of the cover 214.

The first passageway 228 extends from a location between the housing first end 220 and the housing second end 222 to the shoulder 226, has a first passageway central axis 229 disposed substantially perpendicular to the housing lengthwise axis 213, a first passageway length 231, and is sized and configured to receive a portion of the first blade 216. The first passageway 228 has a first inside width 221 and a second inside width 223 that is greater than the first inside width 221. The first inside width 221 is disposed between the housing first end 220 and the shoulder 226 and the second inside width 223 is disposed along the shoulder 226. The second passageway 230 extends from a location between housing first end 220 and the housing second end 222 and toward the housing lengthwise axis 213. The second passageway 230 has a second passageway central axis 233 disposed substantially perpendicular to the housing lengthwise axis 213 and parallel to the first passageway central axis 229, a second passageway length 235, and is sized and configured to receive a portion of a portion of the fuse 350. The second passageway 230 has a first inside width 225 and a second inside width 227 that is less than the first inside width 225. The first inside width 225 is disposed between the housing first end 220 and the housing second end 222 and the second inside width 227 is disposed between the housing first end 220 and the housing second end 222. The fourth passageway 352 is disposed between the second passageway 230 and the fifth passageway 354 and is sized and configured to house the fuse 350. The fourth passageway 352 is in communication with the second passageway 230 and the fifth passageway 354. The fifth passageway 354 extends from the fourth passageway 352 to the shoulder 226 and is sized and configured to house a portion of the second blade 218.

Figure 20:
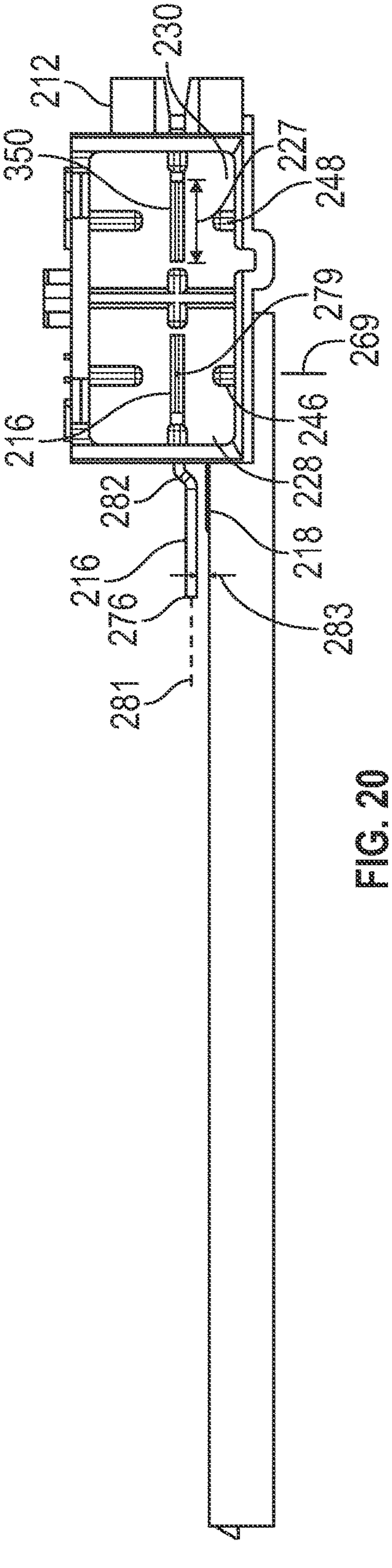
FIG. 20 is a side view of the housing, the first blade, and the second blade of the electrical connector shown in FIG. 12.
Figure 21:
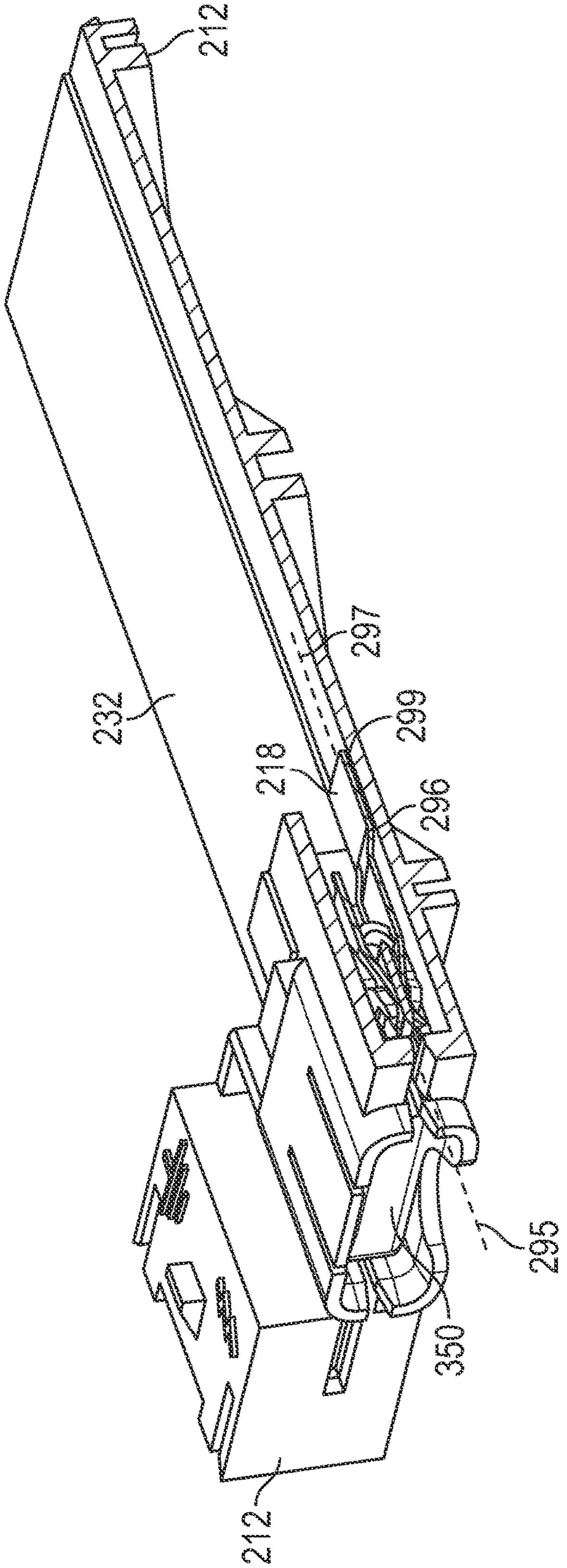
FIG. 21 is a cross-section view of the housing, the first blade, and the second blade of the electrical connector shown in FIG. 16 taken along line 21-21.
Figure 22:
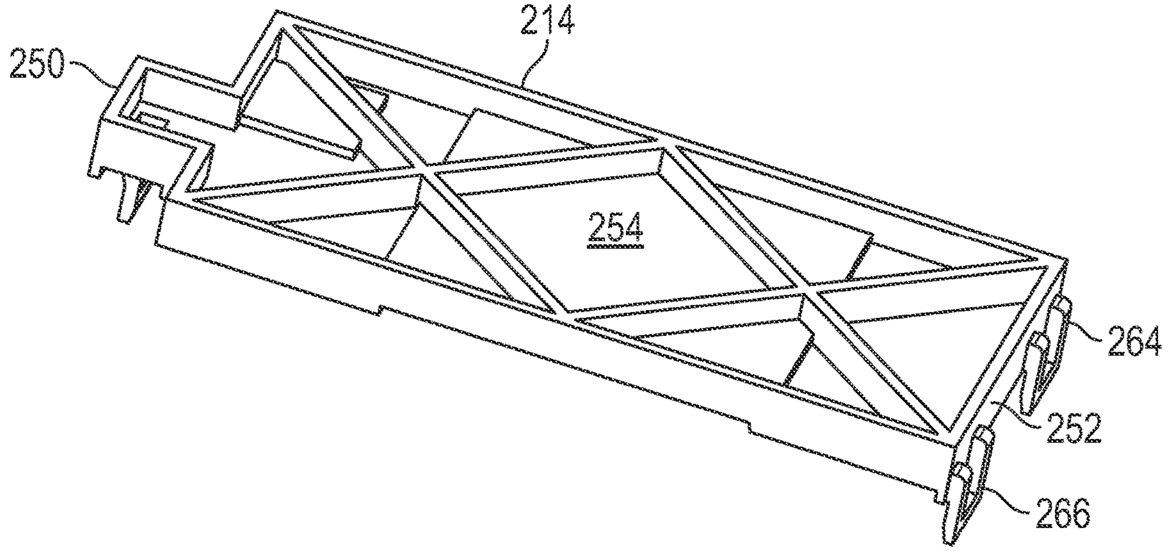
FIG. 22 is a perspective view of the cover of the electrical connector shown in FIG. 12.
Figure 23:
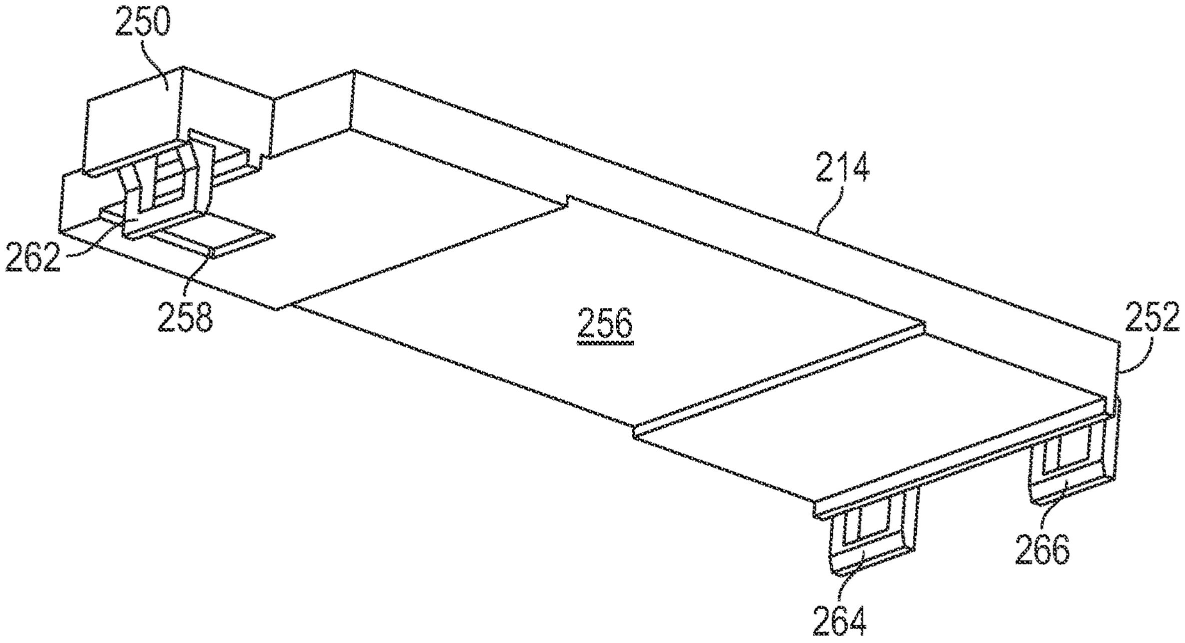
FIG. 23 is another perspective view of the cover of the electrical connector shown in FIG. 12.

Each of the first passageway 228 and the second passageway 230 facilitates the insertion and securing of other electrical connectors to the electrical connector 210. As shown in FIG. 20, the housing 212 defines a first keyed track 246 within the first passageway 228 and a second keyed track 248 in the second passageway 230. The first keyed track 246 and the second keyed track 248 allow an electrical connector having a mating structural arrangement to be inserted into the first passageway 228 or the second passageway 230, which prevents use of connectors that do not have a mating configuration.

The projection 232 extends from the housing second end 222 toward the housing first end 220. In the illustrated embodiment, the projection 232 extends from the shoulder 226 to the housing second end 222. The projection 232 provides structure on which one or more flat flexible cables can be disposed, as described in more detail herein. The first recess 234 is defined on the projection 232. The first recess 234 extends from the shoulder 226 toward the housing second end 222 and into the projection 232. The first recess 234 is sized and configured to house a portion of the second blade 218.

Figure 12:
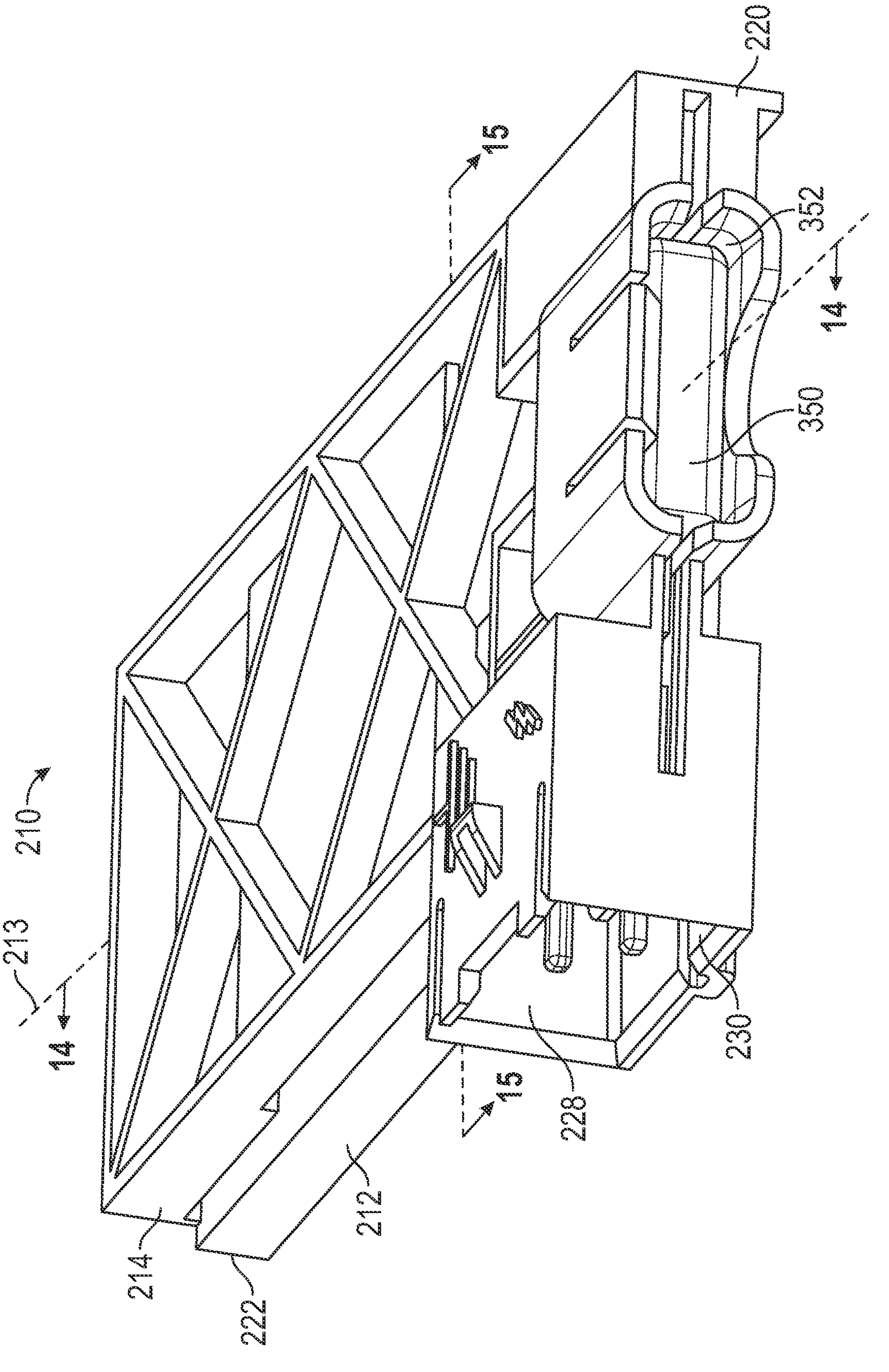
FIG. 12 is a perspective view of a second embodiment of an electrical connector.
Figure 13:
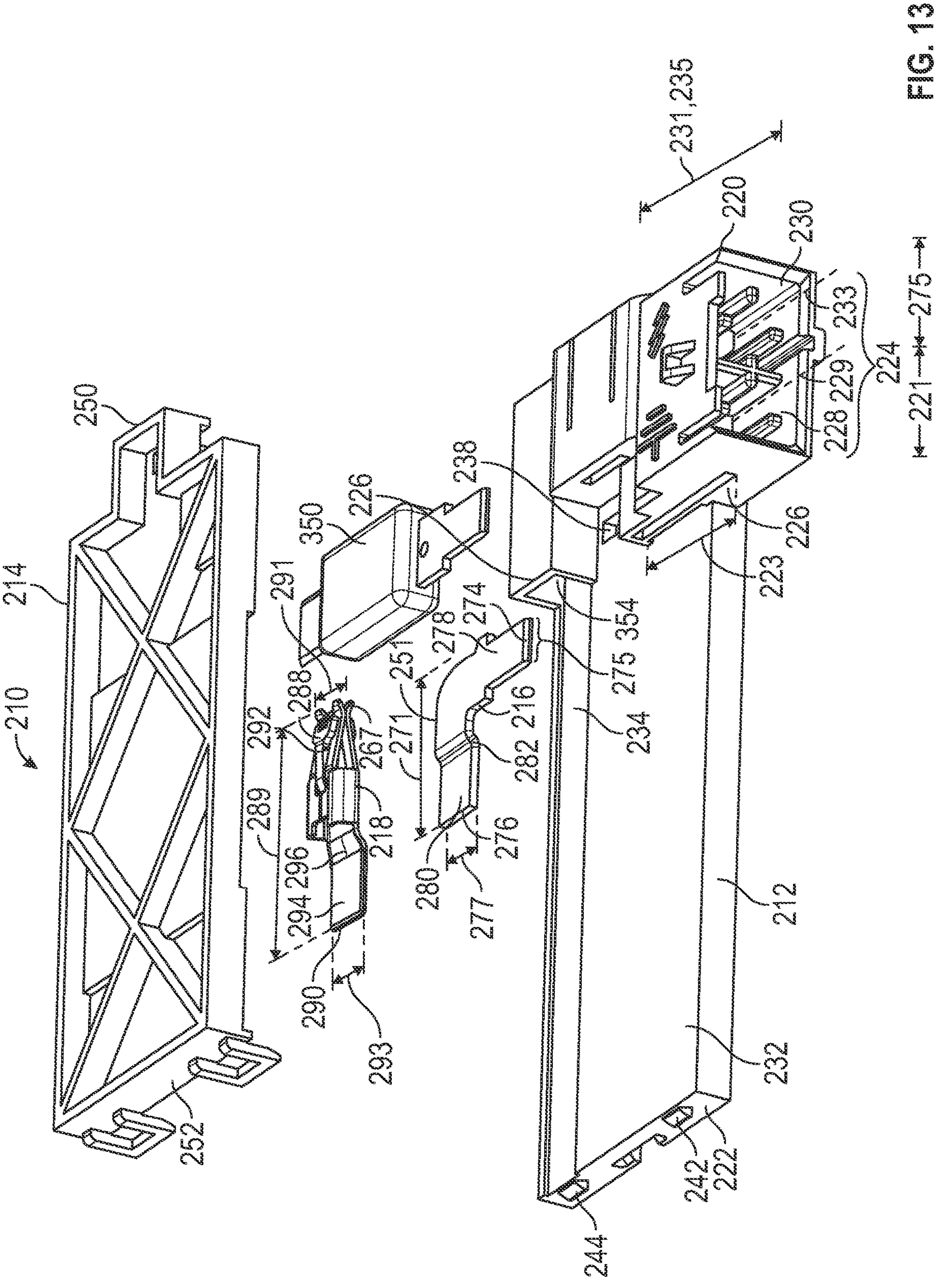
FIG. 13 is an exploded view of the electrical connector shown in FIG. 12.
Figure 14:
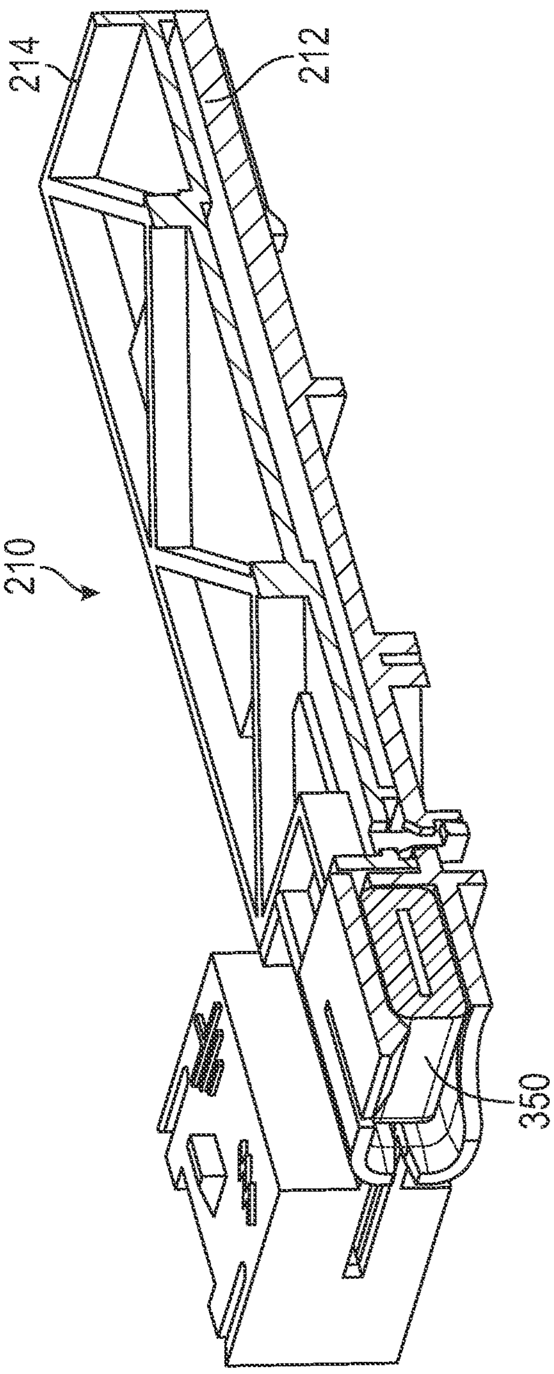
FIG. 14 is a sectional view of the electrical connector shown in FIG. 12 taken along line 14-14.

The cover 214 is attachable to the housing 212 when disassembled, as shown in FIG. 13. When assembled, as shown in FIG. 12, the cover 214 is releasably attached to the housing 212, is disposed on the projection 232, and disposed adjacent to the shoulder 226. The cover 214 has a cover first end 250, a cover second end 252, a top 254, and a bottom 256, and defines a first recess 258, a first projection 262, a second projection 264, and a third projection 266.

The first recess 258 extends from the cover first end 250 toward the cover second end 252 and from the bottom 256 toward the top 254. The first recess 258 is sized and configured to house a portion of the second blade 218.

The first blade 216 is partially disposed within the first passageway 228 and has a first blade first end 274, a first blade second end 276, a first blade length 271, a first blade first portion 278, a first blade second portion 280, a first blade curve 251, and a first blade bend 282. When the cover 214 is releasably attached to the housing 212, the first blade 216 is partially disposed between the cover 214 and the housing 212 (e.g., projection 232). The first blade length 271 extends from the first blade first end 274 to the first blade second end 276 and is less than the first passageway length 231. The first blade first portion 278 extends from the first blade first end 274 to the first blade curve 251 and has a first width 275. The first blade second portion 280 extends from the first blade second end 276 to the first blade bend 282 and has a second width 277 that is greater than the first width 275. The first blade bend 282 is disposed between the first blade first portion 278 and the first blade second portion 280. The first blade first portion 278 has a first lengthwise axis 279 and the first blade second portion 280 has a second lengthwise axis 281. The first lengthwise axis 279 is not parallel to the second lengthwise axis 281 and is disposed on a hypothetical plane 269 that is disposed substantially perpendicular to the second lengthwise axis 281. In the illustrated embodiment, as shown in FIG. 20, the first blade second end 276 is disposed a first distance 283 from the projection 232 and the first blade bend 282 is disposed between the projection 232 and the cover 214.

The second blade 218 is partially disposed within the fifth passageway 354, partially disposed within the first recess 234, and has a second blade first end 288, a second blade second end 290, a second blade length 289, a second blade first portion 292, a second blade second portion 294, and a second blade bend 296. The second blade first end 288 includes retention arms 267 that provide structure for releasably, or fixedly, attaching the second blade 218 to the fuse 350. When the cover 214 is releasably attached to the housing 212, the second blade 218 is partially disposed between the cover 214 and the housing 212 (e.g., projection 232). The second blade length 289 extends from the second blade first end 288 to the second blade second end 290 and is less than the second passageway length 235. The second blade first portion 292 extends from the second blade first end 288 to the second blade bend 296 and has a first width 291. The second blade second portion 294 extends from the second blade second end 290 to the second blade bend 296 and has a second width 293 that is greater than the first width 291. The second blade bend 296 is disposed between the second blade first portion 292 and the second blade second portion 294. The second blade first portion 292 has a first lengthwise axis 295 and the second blade second portion 294 has a second lengthwise axis 297. The first lengthwise axis 295 is parallel to the second lengthwise axis 297 and is noncoaxial with the second lengthwise axis 297. In the illustrated embodiment, the second blade second end 290 disposed a second distance 299 from the projection 232 and the second blade bend 296 is disposed between the shoulder 226 and the cover 214. The second distance 299 is different than the first distance 283. In the illustrated embodiment, the second distance 299 is less than the first distance 283.

The fuse 350 is disposed within the fourth passageway 352 and is partially disposed within the second passageway 230 and the fifth passageway 354. The fuse 350 is electrically connected to the second blade 218 and can comprise any suitable fuse. Selection of a suitable fuse to include in an electrical connector can be based on various considerations, such as the intended use of the electrical connector.

Figure 15:
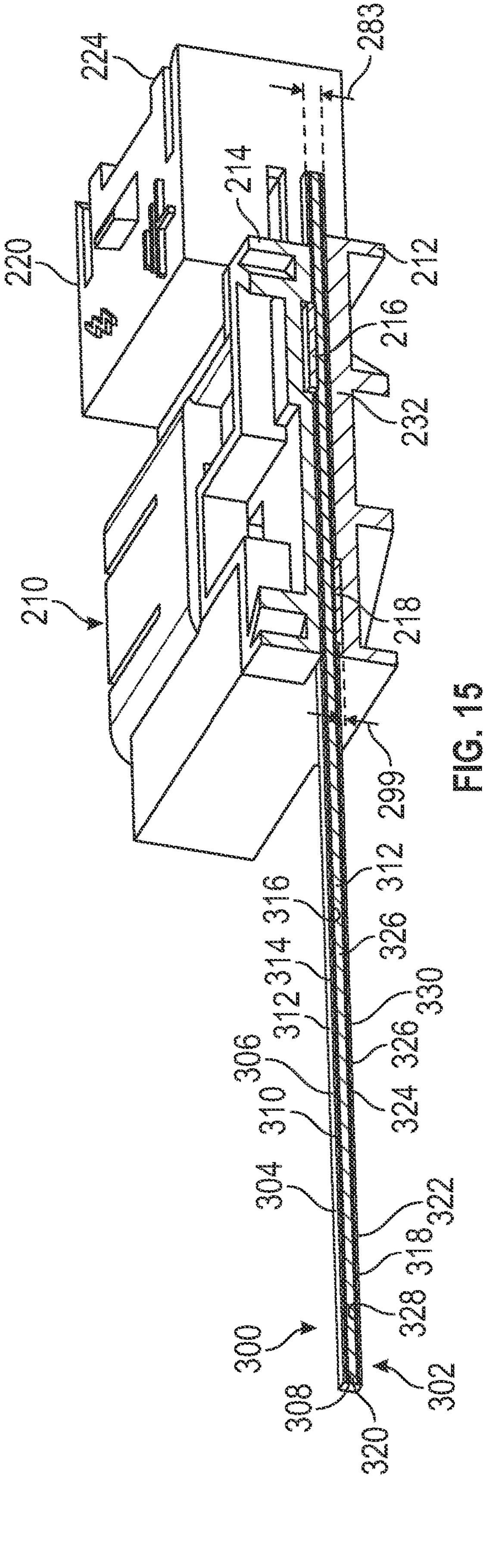
FIG. 15 is a sectional view of the electrical connector shown in FIG. 12 taken along line 15-15. A first conductive structure and a second conductive structure are shown disposed between the housing and the cover.
Figure 17:
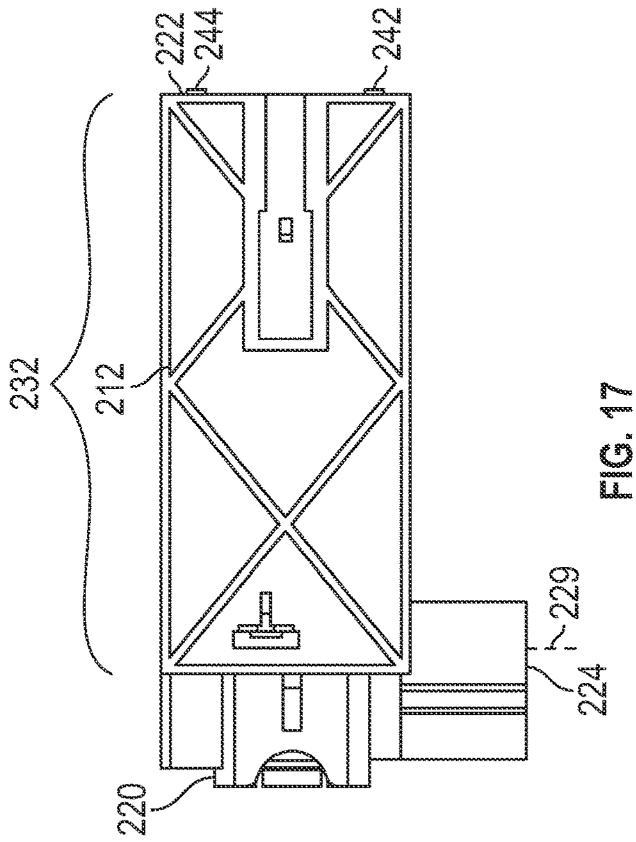
FIG. 17 is a bottom view of the housing of the electrical connector shown in FIG. 12.
Figure 16:
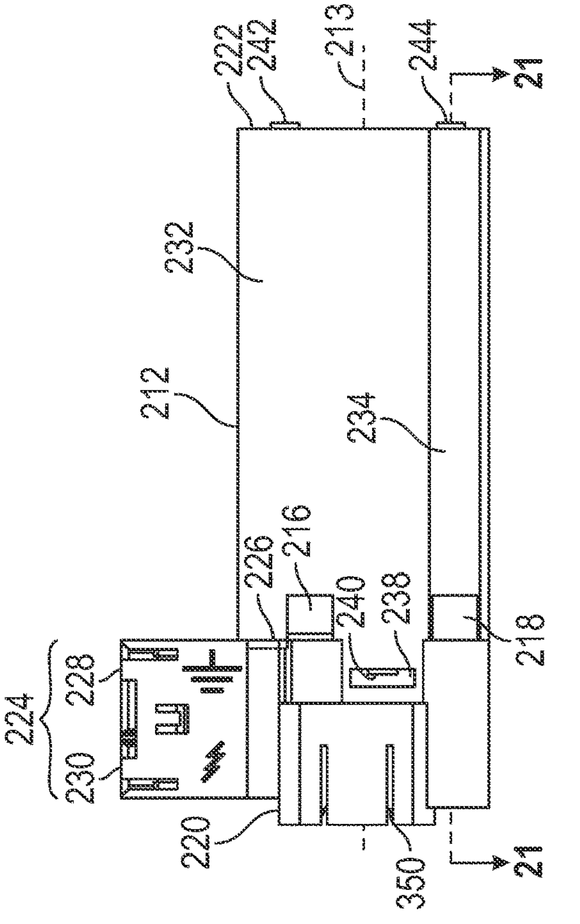
FIG. 16 is a top view of the housing, the first blade, and the second blade of the electrical connector shown in FIG. 12.
Figure 19:
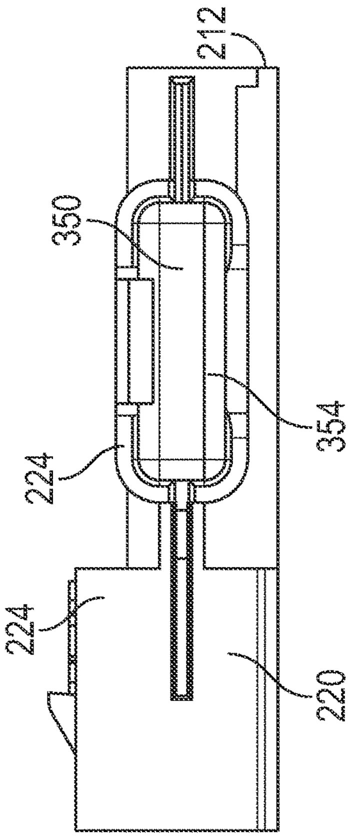
FIG. 19 is a rear view of the housing, the first blade, and the second blade of the electrical connector shown in FIG. 12.
Figure 18:
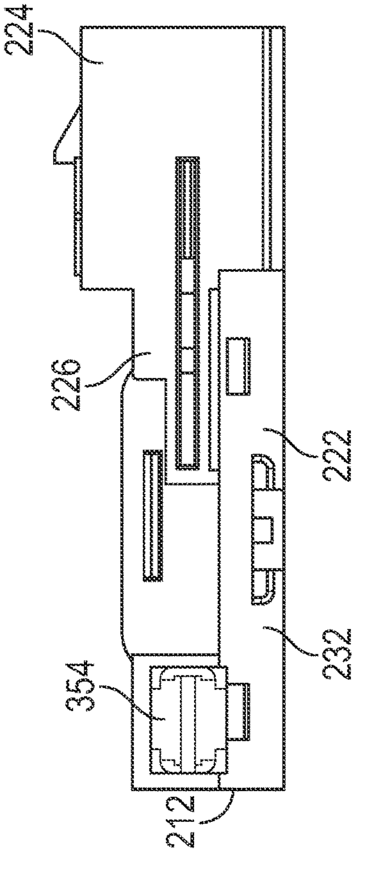
FIG. 18 is a front view of the housing of the electrical connector shown in FIG. 12.

As shown in FIG. 15, during use, a first conductive structure 300 and a second conductive structure 302 can be positioned between the housing 212 and the cover 214 and attached (e.g., releasably) to the electrical connector 210. In the illustrated embodiment, the first conductive structure 300 is a flat flexible cable 304 that has a first side 306, a second side 308, an electrically conductive trace 310, and an outer electrically non-conductive insulator 312 surrounding the electrically conductive trace 310. The electrically conductive trace 310 has a top 314 and a bottom 316. A portion of the electrically non-conductive insulator 312 is removed along the first side 306 and adjacent to, or near, the first blade 216 such that an electrical connection between the first blade 216 and the electrically conductive trace 310 is achieved. As shown in FIG. 15, the first blade 216 contacts the top 314 of the electrically conductive trace 310 to accomplish the electrical connection.

In the illustrated embodiment, the second conductive structure 302 is a flat flexible cable 318 that has a first side 320, a second side 322, an electrically conductive trace 324, and an outer electrically non-conductive insulator 326 surrounding the electrically conductive trace 324. The electrically conductive trace 324 has a top 328 and a bottom 330. A portion of the electrically non-conductive insulator 326 is removed along the second side 322 and adjacent to, or near, the second blade 218 such that an electrical connection between the second blade 218 and the electrically conductive trace 324 is achieved. As shown in FIG. 15, the second blade 218 contacts the bottom 330 of the electrically conductive trace 324 to accomplish the electrical connection.

The first blade 216 is attached to the electrically conductive trace 310 and the second blade 218 is attached to the electrically conductive trace 324. Attachment between a blade and an electrically conductive trace can be accomplished using any suitable technique or method of attachment, and selection of a suitable type of attachment can be based on various considerations, such as the material(s) forming a blade and/or an electrically conductive trace. Examples of techniques and methods of attachment considered suitable between a blade and an electrically conductive trace include using adhesives, ultrasonic welding, and any other technique or method considered suitable for a particular embodiment.

In use, and while the cover 214 is free of the housing 212, the first and second conductive structures 300, 302 are positioned on the projection 232 of the housing 212 such that the first conductive structure 300 is electrically connected to the first blade 216 and the second conductive structure 302 is electrically connected to the second blade 218. Subsequently, the cover 214 is releasably attached to the housing 212 to attach the first and second conductive structures 300, 302 to the electrical connector 210.

The illustration of any component, element, or feature as being disposed above, below, left of, or right of another component, element, or feature is only with reference to the relative location of the components, elements, and features as shown in the figures in order to aid in describing the electrical connectors. Accordingly, some of the components, elements, or features illustrated and described herein can be oriented in any manner desired without departing from the spirit or scope of the invention.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. An electrical connector comprising:
- a housing comprising a housing first end, a housing second end, a connector portion, and defining a shoulder, a first passageway, a second passageway, and a projection, the connector portion extending from the housing first end to the shoulder, the projection extending from the shoulder to the housing second end, the first passageway and the second passageway defined on the connector portion, the first passageway extending from the housing first end to the shoulder;
- a cover releasably attached to the housing;
- a first blade partially disposed within the first passageway, the first blade attached to the housing and comprising a first blade first end and a first blade second end, the first blade second end disposed a first distance from the projection; and
- a second blade partially disposed within the second passageway, the second blade attached to the housing and comprising a second blade first end and a second blade second end, the second blade second end disposed a second distance from the projection that is different than the first distance.

2. The electrical connector of claim 1, wherein the second distance is less than the first distance.

3. The electrical connector of claim 1, wherein the housing has a housing lengthwise axis extending from the housing first end to the housing second end; and
- wherein the first passageway has a first central axis disposed parallel to the housing lengthwise axis.

4. The electrical connector of claim 3, wherein the second passageway has a second central axis disposed parallel to the housing lengthwise axis.

5. The electrical connector of claim 1, wherein the first passageway has a first central axis; and
- wherein the second passageway has a second central axis disposed parallel to the first central axis.

6. The electrical connector of claim 1, wherein the housing has a housing lengthwise axis extending from the housing first end to the housing second end; and
- wherein the first passageway has a central axis disposed substantially perpendicular to the housing lengthwise axis.

7. The electrical connector of claim 1, wherein the cover is disposed on the projection; and
- wherein the cover defines a first projection disposed between the first blade and the second blade.

8. The electrical connector of claim 1, wherein each of the first blade and the second blade is partially disposed between the cover and the projection.

9. The electrical connector of claim 1, wherein the housing defines a first recess and a second recess on the projection.

10. The electrical connector of claim 9, wherein each of the first recess and the second recess extends from the shoulder toward the housing second end;
- wherein the first blade is partially disposed within the first recess; and
- wherein the second blade is partially disposed within the second recess.

11. The electrical connector of claim 1, wherein the second passageway extends from the housing first end to the shoulder.

12. The electrical connector of claim 1, wherein the first blade has a first blade first portion, a first blade second portion, and a first blade bend between the first blade first portion and the first blade second portion.

13. The electrical connector of claim 12, wherein the first blade first portion is partially disposed within the first passageway.

14. The electrical connector of claim 12, wherein the first blade first portion has a first lengthwise axis; and wherein the first blade second portion has a second lengthwise axis that is noncoaxial with the first lengthwise axis.

15. The electrical connector of claim 12, wherein the second blade has a second blade first portion, a second blade second portion, and a second blade bend between the second blade first portion and the second blade second portion.

16. The electrical connector of claim 15, wherein the second blade first portion is partially disposed within the second passageway.

17. The electrical connector of claim 15, wherein the second blade first portion has a first lengthwise axis; and wherein the second blade second portion has a second lengthwise axis that is noncoaxial with the first lengthwise axis of the second blade.

18. The electrical connector of claim 1, wherein the housing and the cover are formed of an electrically nonconductive material; and wherein the first blade and the second blade are formed of an electrically conductive material.

19. An electrical connector comprising:

a housing comprising a housing first end, a housing second end, a connector portion, and defining a shoulder, a first passageway, a second passageway, and a projection, the connector portion extending from the housing first end to the shoulder, the projection extending from the shoulder to the housing second end, the first passageway and the second passageway defined on the connector portion, the first passageway extending from the housing first end to the shoulder;

a cover releasably attached to the housing and disposed on the projection;

a first blade partially disposed within the first passageway and between the cover and the projection, the first blade attached to the housing and comprising a first blade first end and a first blade second end, the first blade second end disposed a first distance from the projection; and a second blade partially disposed within the second passageway and between the cover and the projection, the second blade attached to the housing and comprising a second blade first end and a second blade second end, the second blade second end disposed a second distance from the projection that is different than the first distance.

20. An electrical connector comprising:

a housing comprising a housing first end, a housing second end, a connector portion, and defining a shoulder, a first passageway, a second passageway, and a projection, the connector portion extending from the housing first end to the shoulder, the projection extending from the shoulder to the housing second end, the first passageway and the second passageway defined on the connector portion, the first passageway extending from the housing first end to the shoulder;

a cover releasably attached to the housing and disposed on the projection;

a first blade partially disposed within the first passageway and between the cover and the projection, the first blade attached to the housing and comprising a first blade first end, a first blade second end, a first blade first portion, a first blade second portion, and a first blade bend between the first blade first portion and the first blade second portion, the first blade second end disposed a first distance from the projection, the first blade first portion partially disposed within the first passageway; and a second blade partially disposed within the second passageway and between the cover and the projection, the second blade attached to the housing and comprising a second blade first end, a second blade second end, a second blade first portion, a second blade second portion, and a second blade bend between the second blade first portion and the second blade second portion, the second blade second end disposed a second distance from the projection that is different than the first distance, the second blade first portion partially disposed within the second passageway.

* * * * *